(12) United States Patent
Vendrig

(10) Patent No.: US 10,586,130 B2
(45) Date of Patent: Mar. 10, 2020

(54) METHOD, SYSTEM AND APPARATUS FOR PROVIDING ACCESS TO VIDEOS

(71) Applicant: CANON KABUSHIKI KAISHA, Tokyo (JP)

(72) Inventor: Jeroen Vendrig, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 15/844,323

(22) Filed: Dec. 15, 2017

(65) Prior Publication Data

US 2018/0181841 A1    Jun. 28, 2018

(30) Foreign Application Priority Data

Dec. 22, 2016 (AU) ................................ 2016277697

(51) Int. Cl.
| | |
|---|---|
| *G06K 9/62* | (2006.01) |
| *G06K 9/00* | (2006.01) |
| *H04N 21/218* | (2011.01) |
| *H04N 21/6587* | (2011.01) |
| *H04N 21/234* | (2011.01) |

(Continued)

(52) U.S. Cl.
CPC ....... *G06K 9/6267* (2013.01); *G06K 9/00771* (2013.01); *H04N 5/23206* (2013.01); *H04N 5/247* (2013.01); *H04N 7/181* (2013.01); *H04N 21/21805* (2013.01); *H04N 21/23418* (2013.01); *H04N 21/4223* (2013.01); *H04N 21/6587* (2013.01); *G06Q 50/26* (2013.01); *H04N 5/23296* (2013.01); *H04N 21/2743* (2013.01)

(58) Field of Classification Search
CPC ............. G06K 9/6261; G06K 9/00771; G06K 9/00335; G06K 9/00288; H04N 5/23206; H04N 5/247; H04N 5/23296; H04N 7/181; H04N 21/632; H04N 21/23418; H04N 21/21805; H04N 21/4223; H04N 21/6587; H04N 21/2743; G06Q 50/26; G06Q 20/409
USPC .......................................... 382/224
See application file for complete search history.

(56) References Cited

U.S. PATENT DOCUMENTS 7,801,802 B2    9/2010   Walker et al.
2006/0277092 A1   12/2006   Williams
(Continued)

OTHER PUBLICATIONS

Placemeter, Make your city better, get paid along the way, published on Mar. 31, 2014, https://web.archive.org/web/20140331105132/http://www.placemeter.com/.

(Continued)

*Primary Examiner* — Ali Bayat
(74) *Attorney, Agent, or Firm* — Canon U.S.A., Inc. IP Division

(57) ABSTRACT

The present invention relates to a computer implemented method of accessing a video. The method comprises the steps of receiving a request to access the video, the request including information relating to an object of interest. The method then determines a confidence score corresponding to the request for the video capture device and determines a cost associated with adjusting the video capture device from an initial configuration state to at least one of adjusted configuration states. Access to the video is the provided from the video capture device using the at least one of adjusted configuration states based on the confidence score and the cost.

28 Claims, 6 Drawing Sheets

(51) Int. Cl.
  *H04N 21/4223* (2011.01)
  *H04N 5/232* (2006.01)
  *H04N 5/247* (2006.01)
  *H04N 7/18* (2006.01)
  *H04N 21/2743* (2011.01)
  *G06Q 50/26* (2012.01)

(56) References Cited

U.S. PATENT DOCUMENTS

| | | | |
|---|---|---|---|
| 2008/0199155 A1* | 8/2008 | Hagens | H04N 7/141 |
| | | | 386/291 |
| 2012/0197856 A1 | 8/2012 | Banka et al. | |
| 2015/0047024 A1* | 2/2015 | Park | G06Q 30/0645 |
| | | | 726/19 |
| 2015/0163535 A1* | 6/2015 | Mccarthy, III | G07C 9/00571 |
| | | | 725/49 |
| 2016/0094805 A1* | 3/2016 | Wang | H04N 7/181 |
| | | | 725/93 |
| 2016/0192009 A1* | 6/2016 | Sugio | H04N 21/4756 |
| | | | 725/32 |
| 2018/0089505 A1* | 3/2018 | El-Khamy | G06T 7/11 |
| 2018/0101960 A1* | 4/2018 | Boonyasiriwat | G06K 9/00771 |

OTHER PUBLICATIONS

Wordstream, What is Google AdWords? How the AdWords Auction Works, published on Aug. 5, 2015, http://www.wordstream.com/articles/what-is-google-adwords.

* cited by examiner

METHOD, SYSTEM AND APPARATUS FOR PROVIDING ACCESS TO VIDEOS

REFERENCE TO RELATED PATENT APPLICATION

This application claims the benefit under 35 U.S.C. § 119 of the filing date of Australian Patent Application No. 2016277697, filed 22 Dec. 2016, hereby incorporated by reference in its entirety as if fully set forth herein.

TECHNICAL FIELD

The present invention generally relates to an imaging system and method for classifying video content.

BACKGROUND

A large number of surveillance sensors have been deployed around the world. The surveillance sensors are usually connected to a private network of sensors, varying from small networks (e.g. in a home) to large networks (e.g. covering a city's public transport facilities). The ownership of the sensor networks, and the ownership of the content (e.g., images, video, and the like) captured by the sensor networks, is strongly related to the ownership of the property on which the sensor networks are installed. Installation of the sensor networks are typically motivated by the objective of protecting the property through surveillance. However, in practice, there is a need for use of the content captured by the sensor networks by other parties for other purposes such as security (e.g., law enforcement) or business analysis.

There is little incentive to share content between different sensor networks or with third parties, especially in the case of surveillance video. Law enforcement services may apply for a court order to access content, but the due process involved in such an order reduces the timeliness of the information. Due to the delay, the information can be used forensically only, without the opportunity to use information as actionable intelligence to respond to issues immediately. Other parties are left to time consuming negotiations, which are worthwhile only for long ongoing access to the sensor networks.

One approach sets up a sharing arrangement, where owners install a camera phone on their window to record videos of a viewpoint. A photo of the viewpoint from the window is submitted to a mediator. The mediator assesses the usefulness of the viewpoint in the context of many other submissions. If the mediator accepts the photo, the camera phone owner is then paid a pro rata fee whenever the camera phone is recording for this purpose, regardless of what is happening in the scene observed from the viewpoint. The owner has to determine whether to install the camera phone at the window or use the camera phone for other purposes.

In addition to sharing content captured by private sensor networks in the course of their operations, there is a need for third parties to capture content from the private sensor networks in a way that is different from the owner's requirements. For example, a higher video resolution may be needed to recognise a face or license plate, or a higher video frame rate may be needed to observe a suspicious action by a criminal.

In addition, the availability of actuated sensors, such as pan-tilt-zoom (PTZ) cameras in camera networks, means that some content could be captured by the sensor, but is not captured because the acquiring sensor is pointed elsewhere. As it is not possible to retrospectively change sensor settings, the forensic approach does not accommodate such information needs. One approach defines an information need (e.g., capture a frontal face of each person in the scene) and actuates a camera to fulfil the information need, considering transition costs (i.e., when the camera is changing capture state (i.e., configurations of the camera), there is a period in which the video stream is not useful due to blur and the like). However, the approach assumes that full control over all cameras in the camera network is available, which is not the case when using a third party's camera network.

Thus, there exists a need for providing access to content from a third party's sensor networks to provide content in a timely manner and content that is fit for the purpose of analysis. Such a provision of the third party's sensor network should also be in such a way that the third party has an incentive to share content while respecting the third party's own operations.

SUMMARY

Disclosed are arrangements for providing access to videos of a sensor network.

An aspect of the present disclosure provides a computer implemented method of accessing a video captured by a video capture device, said method comprising: receiving a request to access the video, the request including information relating to an object of interest; determining a confidence score corresponding to the request for the video capture device; determining a cost associated with adjusting the video capture device from an initial configuration state to at least one of adjusted configuration states; and providing access to the video from the video capture device using the at least one of adjusted configuration states based on the confidence score and the cost.

An aspect of the present disclosure provides a system of providing access to video, the system comprising: a requestor system; an exchange mediator in communication with the requestor system; and a plurality of camera networks, each sensor network having a plurality of video capture devices, wherein each camera network is in communication with the exchange mediator, wherein the system is configured for: receiving, by the exchange mediator, a request to access the video from the requestor system, the request including information relating to relating to an object of interest; determining, by the exchange mediator, available video capture devices of the camera networks based on the received request; determining, by the exchange mediator, a confidence score corresponding to the request for at least one of the video capture device; determining, by the exchange mediator, a cost associated with adjusting the at least one of the video capture devices from an initial configuration state to at least one of adjusted configuration states; and providing the requestor system with access to the video from the at least one of the video capture devices using the at least one of adjusted configuration states based on the confidence score and the cost.

According to an aspect of the present disclosure, there is provided a computer implemented method of accessing a video, said method comprising the steps of: receiving a request to access the video, the request including a classification with a classification confidence score of an object of interest; determining available second video capture devices based on the received classification; for each of the available second video capture devices; determining an estimated classification confidence score corresponding to the received classification for each of a plurality of configuration states available at the second video capture device; and determining an adjustment cost value associated with adjusting the second video capture device from an initial configuration state to each of the plurality of configuration states; selecting one of the second video capture devices and one of the configuration states corresponding to the selected second video capture device based on the estimated classification confidence score and the determined adjustment cost value; and adjusting the selected second video capture device to the selected configuration state; and providing access to the video from the adjusted second video capture device.

According to another aspect of the present disclosure, there is provided a system of providing access to video, the system comprising: a requestor system; an exchange mediator in communication with the requestor system; and a plurality of camera networks, each sensor network having a plurality of video capture devices, wherein each camera network is in communication with the exchange mediator, wherein the system is configured for: receiving, by the exchange mediator, a request to access the video from the requestor system, the request including a classification with a classification confidence score of an object of interest; determining, by the exchange mediator, available second video capture devices of the camera networks based on the received classification; for each of the available second video capture devices; determining, by the exchange mediator, an estimated classification confidence score corresponding to the received classification for each of a plurality of configuration states available at the second video capture device; and determining, by the exchange mediator, an adjustment cost value associated with adjusting the second video capture device from an initial configuration state to each of the plurality of configuration states; selecting, by the exchange mediator, one of the second video capture devices and one of the configuration states corresponding to the selected second video capture device based on the estimated classification confidence score and the determined adjustment cost value; and adjusting, by the exchange mediator, the selected second video capture device to the selected configuration state; and providing the requestor system with access to the video from the adjusted second video capture device.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
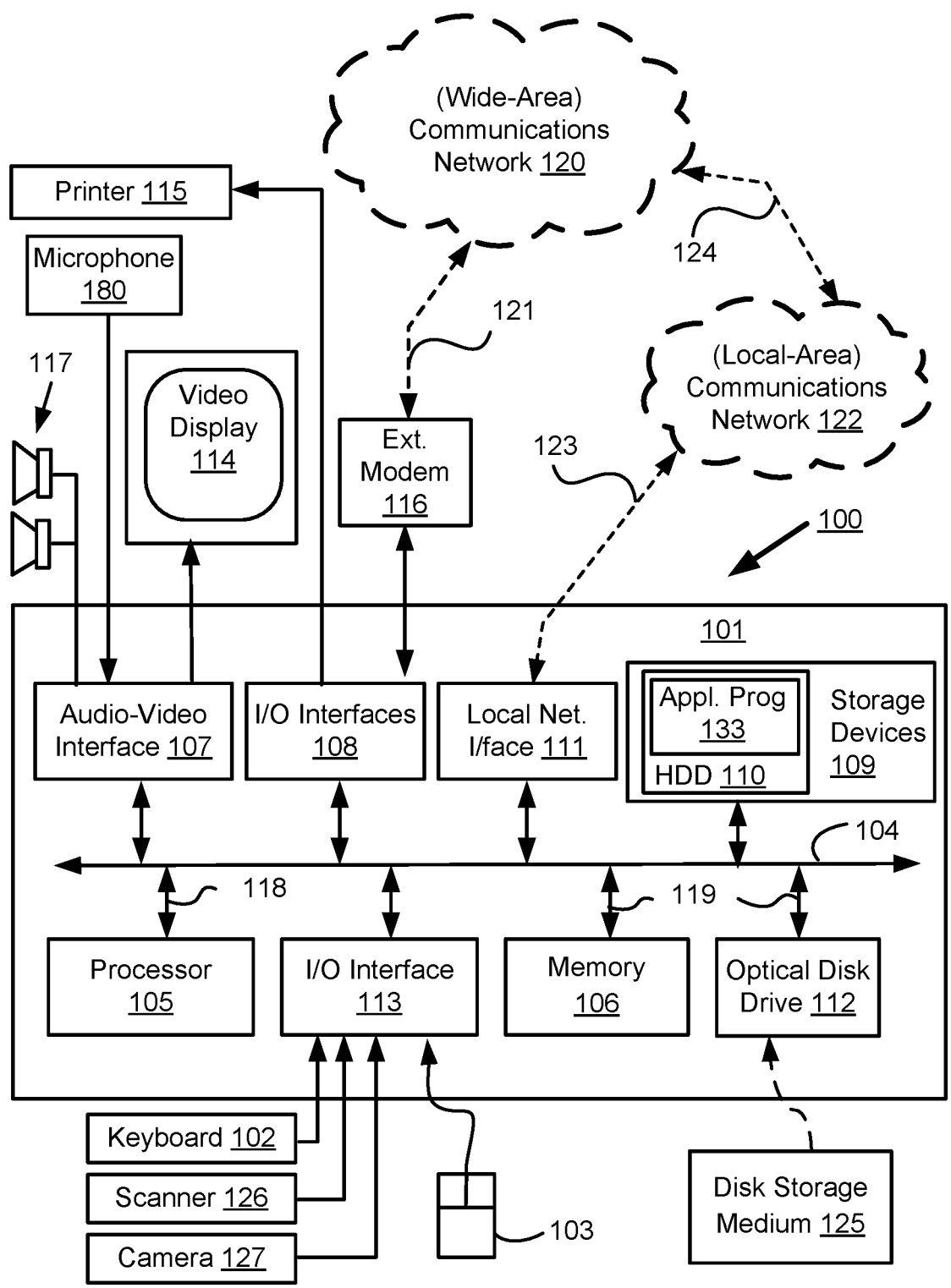
FIGS. 1A and 1B form a schematic block diagram of a general purpose computer system upon which an exchange mediator of the system in FIGS. 2A and 2B can be practiced.

Where reference is made in any one or more of the accompanying drawings to steps and/or features, which have the same reference numerals, those steps and/or features have for the purposes of this description the same function(s) or operation(s), unless the contrary intention appears.

Institutes, companies, and individuals have created surveillance sensor networks to monitor what is going on at a site. The dominant sensor in such networks is typically a surveillance video capture device, also referred to as a video camera. Therefore, the video camera will be used as an example for a sensor hereinafter.

Systems of Providing Access to Videos

System 200A

Figure 2A:
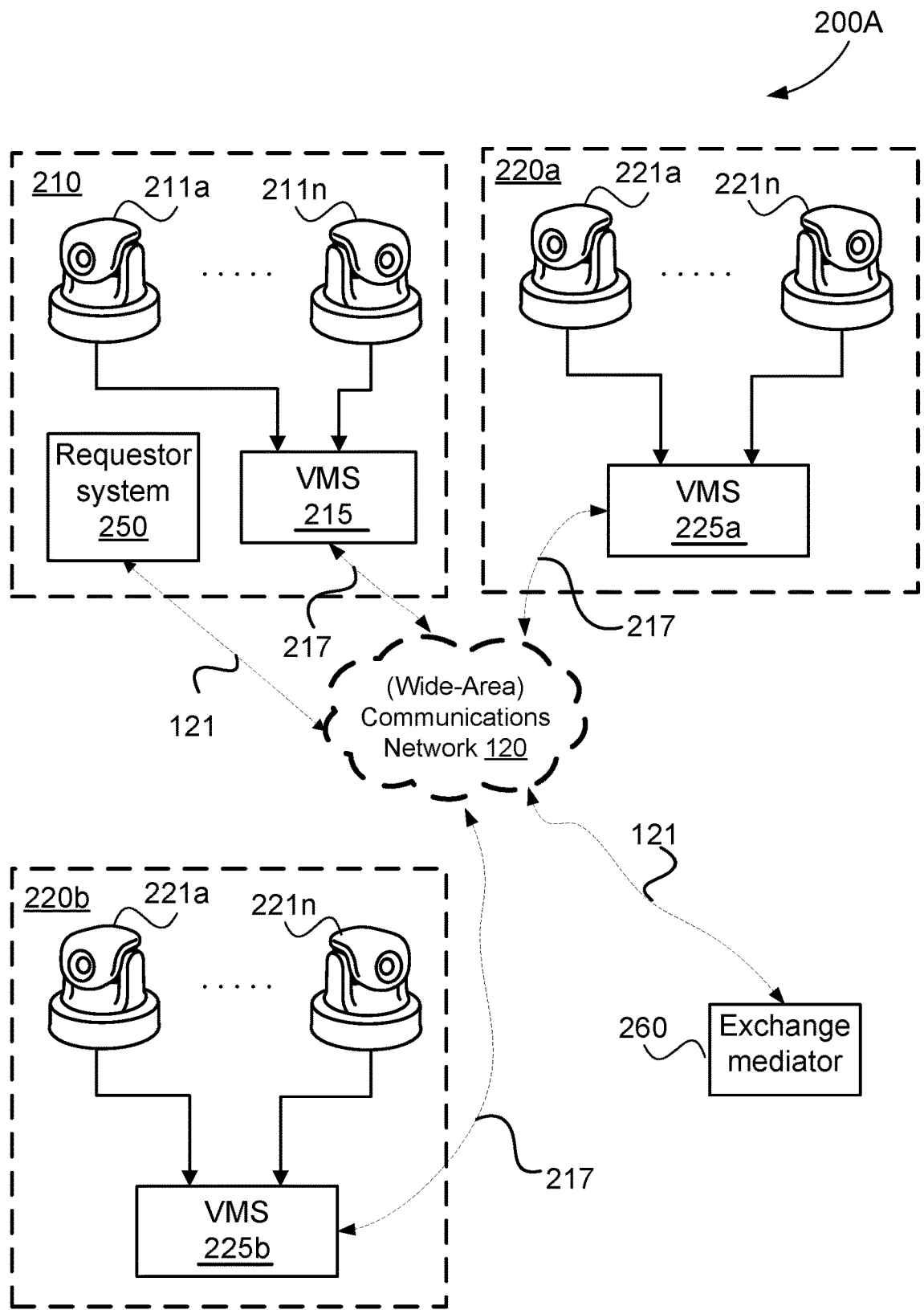
FIG. 2A is a schematic block diagram of a camera network system configured to provide access to videos of a camera network of the camera network system.

FIG. 2A is a schematic diagram showing a system 200A including camera networks 210, 220a, and 220b, and an exchange mediator 260. The system 200A is capable of transferring a video from any one of the camera networks 220a and 220b to a requestor system 250 of the camera network 210. The requestor system 250 will be described below. The exchange mediator 260 manages the transfer of the video from any one of the camera networks 220a and 220b to the requestor system 250.

The camera networks 210, 220a, and 220b communicate with the exchange mediator 260 via a wide-area communications network 120. The camera networks 210, 220a, and 220b are coupled to the wide-area communications network 120 by connections 217 (and also a connection 121 for the camera network 210). The connections 217 and 121 may be wired (e.g., a telephone line, a high capacity (e.g., cable) connection, etc.) or wireless (e.g., cellular communications, etc.). The exchange mediator 260 is coupled to the wide-area communications network 120 by the connection 121, which may be wired (e.g., a telephone line, a high capacity (e.g., cable) connection, etc.) or wireless (e.g., cellular communications, etc.). The connection 121 will be described further in relation to FIG. 1.

The system 200A shown in FIG. 2A is a simplification of the camera network system for ease of description. Any of the camera networks 220a and 220b in the system 200A may also function as the camera network 210 when a requestor system 250 is included in the camera networks 220a and 220b. Further, the camera network 210 may also function as a camera network 220a or 220b when providing access of its videos to a requestor system 250 of another camera network.

The camera networks 220a and 220b are collectively referred to as the camera networks 220 hereinafter. The singular form of "the camera network 220" refers to one of the camera networks 220a and 220b. The system 200A could have more than one camera network 210 and also more or less than 2 camera networks 220.

Camera Network 210

The camera network 210 includes cameras 211a to 211n, the requestor system 250, and a video management system (VMS) 215. Each of the cameras 211a to 211n captures a video of a viewpoint in a scene. A scene is a real-life scene and a viewpoint is the viewpoint of a camera capturing a scene via a lens of the camera. A video is a sequence of video frames of the viewpoint that the camera is capturing.

In one arrangement, the video frames are RGB images. In another arrangement, each video frame in the sequence is encoded as a JPEG image to reduce the bandwidth and storage capacity for the captured video. In yet another arrangement, the sequence of video frames is encoded with inter-frame dependencies, e.g. using H.264 compression, so that even less bandwidth and storage capacity is required at the cost of more processing for encoding and decoding of the captured video.

The cameras 211a to 211n are collectively referred to as the cameras 211 hereinafter. The singular form of "the camera 211" refers to one of the cameras 211.

The VMS 215 provides access to the captured videos. The captured videos may be videos that have been recorded by the cameras 211 and stored in the VMS 215; or real-time videos that the cameras 211 are capturing. When the camera network 210 is functioning as the camera network 220, the VMS 215 communicates with the exchange mediator 260 via the communications network 120 in order to provide access to the videos when requested by the exchange mediator 260.

The requestor system 250 is configured to access the VMS 215 for viewing real-time videos from the cameras 211 or stored videos. The requestor system 250 is also configured to request videos from the camera networks 220 by communicating the request to the exchange mediator 260 via the wide-area communications network 120. The requestor system 250 is coupled to the wide-area communications network 120 via the connection 257. The request for videos includes the information (e.g., time, date, object of interest, etc.) needed, which will be described below in relation to FIG. 3.

Figure 1B:
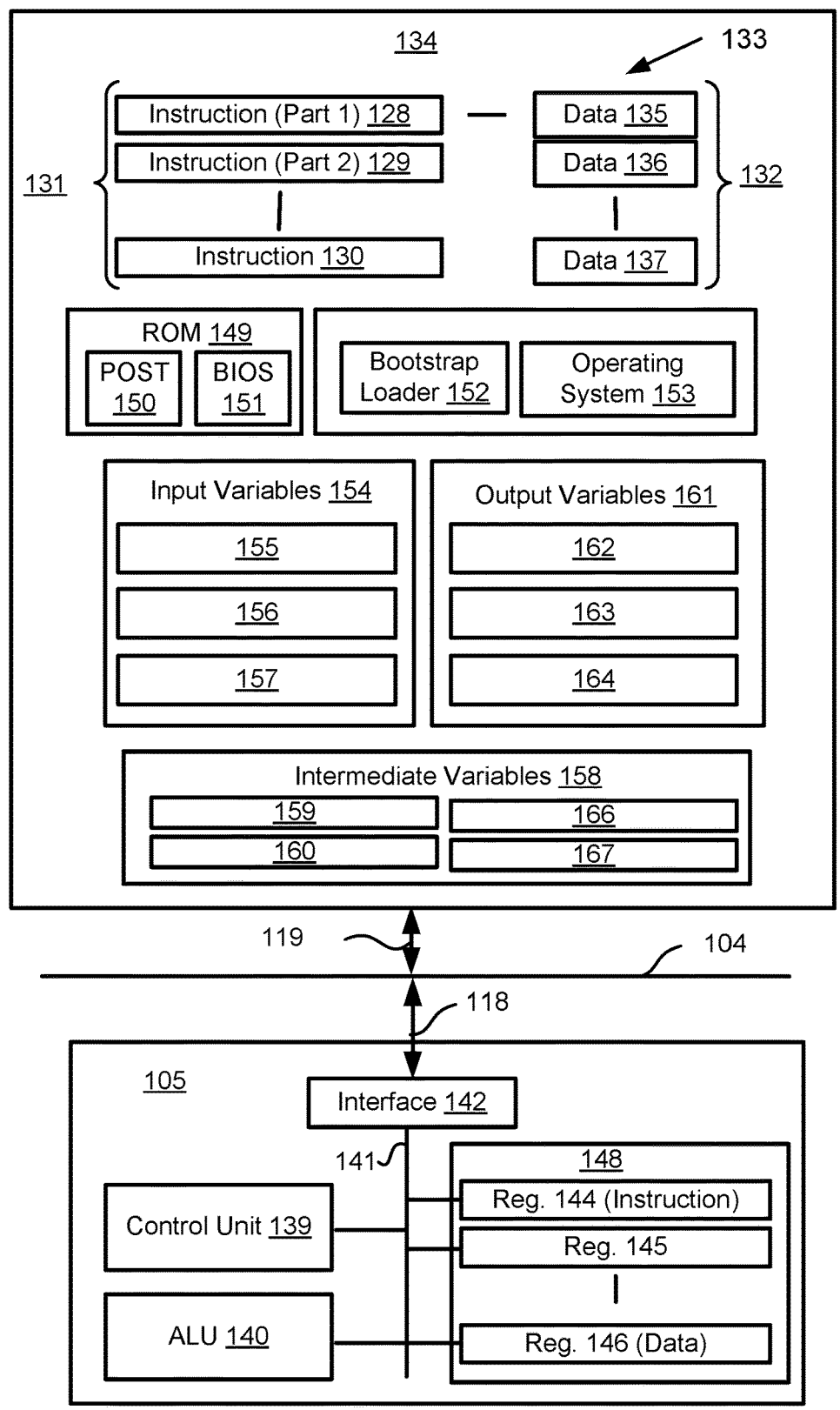

In one arrangement, the requestor system 250 is a computer application program 133 (see FIGS. 1A and 1B and associated description) implemented on a computer system 100 having a display 114 and input devices (such as a keyboard 102 and a mouse 103) (see FIGS. 1A and 1B for the computer system 100 description). A user of the camera network 210 then interacts with the requestor system 250, via the display 114 and input devices 102 and 103, to request for videos from any of the camera networks 220. The structural context of the requestor system 250 will be described further in relation to FIGS. 1A and 1B.

In another arrangement, the requestor system 250 is connected to the VMS 215 via a private network (not shown), and both the requestor system 250 and the VMS 215 are coupled to the wide-area communications network 120 using a single shared connection.

Camera Networks 220

The camera networks 220 are also known as potential supplier networks. Each of the camera networks 220 comprises cameras 221a to 221n and a VMS 225a or 225b.

Each of the cameras 221a to 221n captures videos of a viewpoint in a scene, where each video is a sequence of video frames. In one arrangement, the video frames are RGB images. In another arrangement, each video frame in the sequence is encoded as a JPEG image to reduce the bandwidth and storage capacity for the captured video. In yet another arrangement, the sequence of video frames is encoded with inter-frame dependencies, e.g. using H.264 compression, so that even less bandwidth and storage capacity is required at the cost of more processing for encoding and decoding of the captured video.

The cameras 221a to 221n are collectively referred to as the cameras 221 hereinafter. The singular form of "the camera 221" refers to one of the cameras 221.

Each of the video camera 221 has a configuration state 530 (see FIG. 4), also referred to as a capture state 530. In one arrangement, the configuration state 530 includes the image resolution, the frame rate, the compression ratio of a video being captured by the camera 221. In another arrangement, the configuration state 530 includes the pan-tilt-zoom (PTZ) coordinates of the camera 221. When the camera 221 is a PTZ video camera, the camera 221 has a full viewable scope that is a union of the viewpoints of all possible PTZ coordinates. At any one time, a PTZ video camera 221 observes a current field of viewpoint (FOV) only, which is a subset of the full viewable scope.

The VMS 225a and 225b are collectively referred to as the VMS 225 hereinafter. Each of the VMS 225 provides access to the captured videos. The captured videos may be videos that have been recorded by the cameras 221 and stored in the VMS 215; or real-time videos that the cameras 221 are capturing. The VMS 225 communicates with the exchange mediator 260 via the communications network 120 in order to provide access to the videos when requested by the exchange mediator 260. Each of the VMS 225 is connected to the wide-area communications network 120 via the connection 217, as described above.

The Exchange Mediator 260

The exchange mediator 260, also known as exchange of sensor stream negotiator (ESSN) system, manages a list of the camera networks 210 and 220 that are registered with the exchange mediator 260. The exchange mediator 260 also manages requests from the requestor system 250 of the camera network 210 to access videos of the camera networks 220.

Each of the VMS 225 and the requestor system 250 are provided with logon credentials to the exchange mediator 260. Thus, the requestor system 250 logs onto the exchange mediator 260 to request access to videos of the camera networks 220. The VMS 225 logs onto the exchange mediator 260 to update the settings associated with the camera networks 220.

For example, a requestor system 250 logs onto the exchange mediator 260 and provides the exchange mediator 260 with information needed. The exchange mediator 260 assesses which of the cameras 221 in the camera networks 220 would be capable of meeting the needed information and provides the requestor system 250 with a list of available cameras 221 capable of meeting the needed information. The requestor system 250 then selects one of the cameras 221 from the list and transmits a request to the exchange mediator 260 to provide access to videos from the selected camera 221. The exchange mediator 260 communicates with the selected camera 221 and access to videos of the selected camera is provided to the requestor system 250 via the VMS 225, the wide-area communications network 120, and the VMS 215.

In another example, the VMS 225 logs onto the exchange mediator 260 and adds a camera 221 which videos are accessible via the VMS 225. The exchange mediator 260 then assesses the camera 221 when assessing the needed information from the requestor system 250.

A method of accessing a video of the camera network 220 will be described in relation to FIG. 3.

System 200B

Figure 2B:
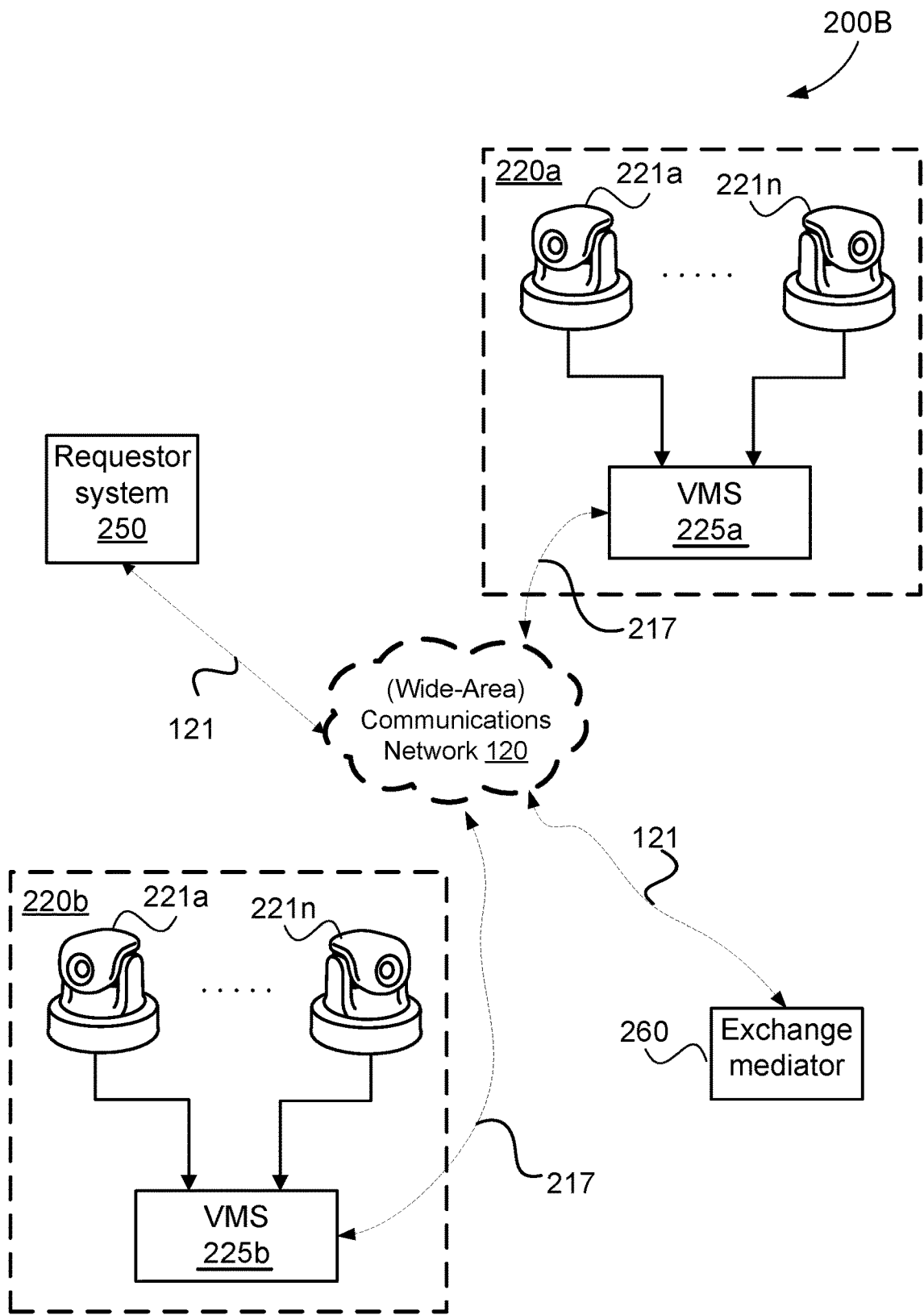
FIG. 2B is a schematic block diagram of an alternative camera network system configured to provide access to videos of a camera network of the camera network system.

FIG. 2B is a schematic diagram showing a system 200B including a requestor system 250, camera networks 220a and 220b, and an exchange mediator 260. The system 200B is capable of transferring a video from any one of the camera networks 220a and 220b to the requestor system 250. The exchange mediator 260 manages the transfer of the video from any one of the camera networks 220a and 220b to the requestor system 250.

The system 200B has the same components as the system 200A. However, the requestor system 250 of the system 200B is not associated with the camera network 210. Otherwise, each of the components (i.e., the cameras 221, the camera networks 220, the VMS 225, the wide-area communications network 120, and the exchange mediator 260) of the system 200B performs the same function as the components of the system 200A

Example Use Cases of the Systems 200A and 200B

When a user of the requestor system 250 requests access to videos of the camera networks 220, owners of the camera networks 220 are reimbursed by the owners of the camera network 210 (in the system 200A) or the owners of the requestor system 250 (in the system 200B) for the cost of the requestor system 250 accessing the videos captured by the cameras 221. Such reimbursement provides an incentive to owners of the camera networks 220 to participate in the system 200. Negotiation is done real-time, machine-to-machine, based on the specific information need and budget from the requestor system 250 and general guidelines or specifications from the owners of the camera networks 220.

In one arrangement of the system 200A, a user of the video camera network 210 operates the requestor system 250 to access the videos of the camera networks 220 via the VMS 215, the wide-area communications network 120, and the VMS 225. In an arrangement of the systems 200A and 200B, the user of the requestor system 250 is located in a control room to watch the video of the camera 221 live. In other arrangements, stored videos of the VMS 225 are accessed when there is a need, e.g. to review what happened the night before a burglary event.

In the system 200A, the camera network 210 is tied to a physical location, corresponding to the ownership. However, events may take place over a larger geography and transcend the boundaries of the camera network 210. For example, a bank robber parks a car on a municipal parking lot, walks through a shopping centre, does a hold-up at the bank site, and then runs back to the parking lot. The event is observed by the camera network 210 (which is located at and owned by the bank) and the camera networks 220 (which are located at separate premises and owned by separate entities). However, only the bank's camera network 210 has the objective to record bank robbers, while the other camera networks 220 have different objectives for their own operations, e.g. detecting illegal parking, catching shoplifters, or customer flow analysis. For the other camera networks 220, recording the bank robber is coincidental.

In the use case of the bank robbery, it is desirable for law enforcement officers to get immediate access to videos of the camera networks 220 near the bank as soon as they are notified of the robbery event. Access to the videos from the cameras 221 directs the search for the object of interest (i.e., the robber), and also assists in better situational awareness for the officers to improve their safety. Some of the video cameras 221 may have a configuration state 530 that does not provide a good view on the robbery event, e.g. the wrong camera angle. However, the video cameras 221 may be a PTZ camera with other configuration states that provide more suitable field of viewpoints with another configuration state 540. The configuration state 530 of the video camera 221 is then changed to a target configuration state 540 (also known as target capture state) to satisfy the information need of the officers, viz. a view on the robbery event such as the robber's escape route, while the event takes place.

Structural Context of the Requestor System 250 and the Exchange Mediator 260

FIGS. 1A and 1B depict a general-purpose computer system 100, upon which the requestor system 250 and the exchange mediator 260 described in relation to FIG. 2 can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from the communications network 120 via the connection 121. The communications network 120 is a wide-area network (WAN), such as the Internet, or a cellular telecommunications network. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

Figure 3:
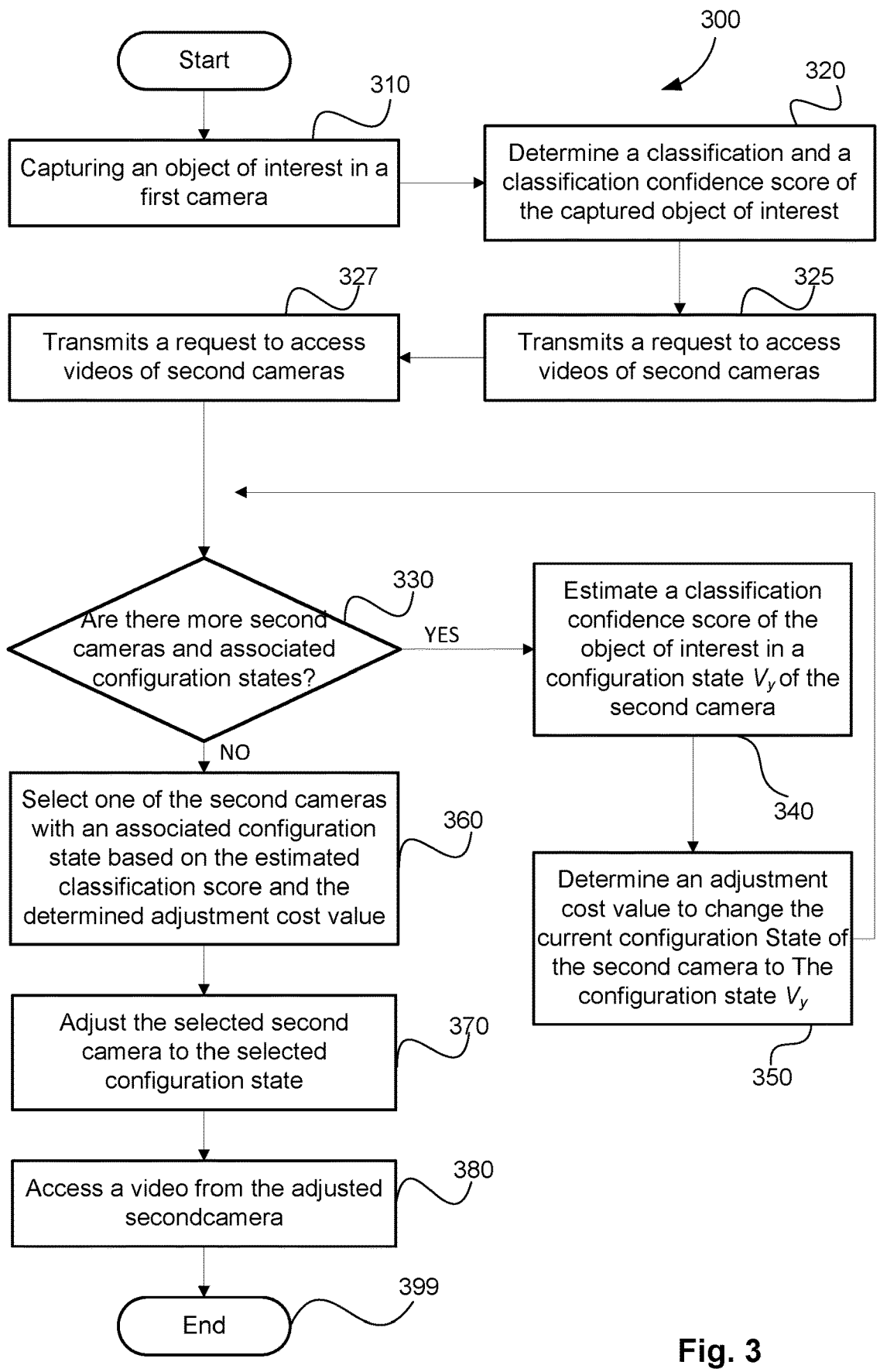
FIG. 3 is a schematic flow diagram illustrating a method of providing access to a video of the camera network systems of FIGS. 2A and 2B.
Figure 4:
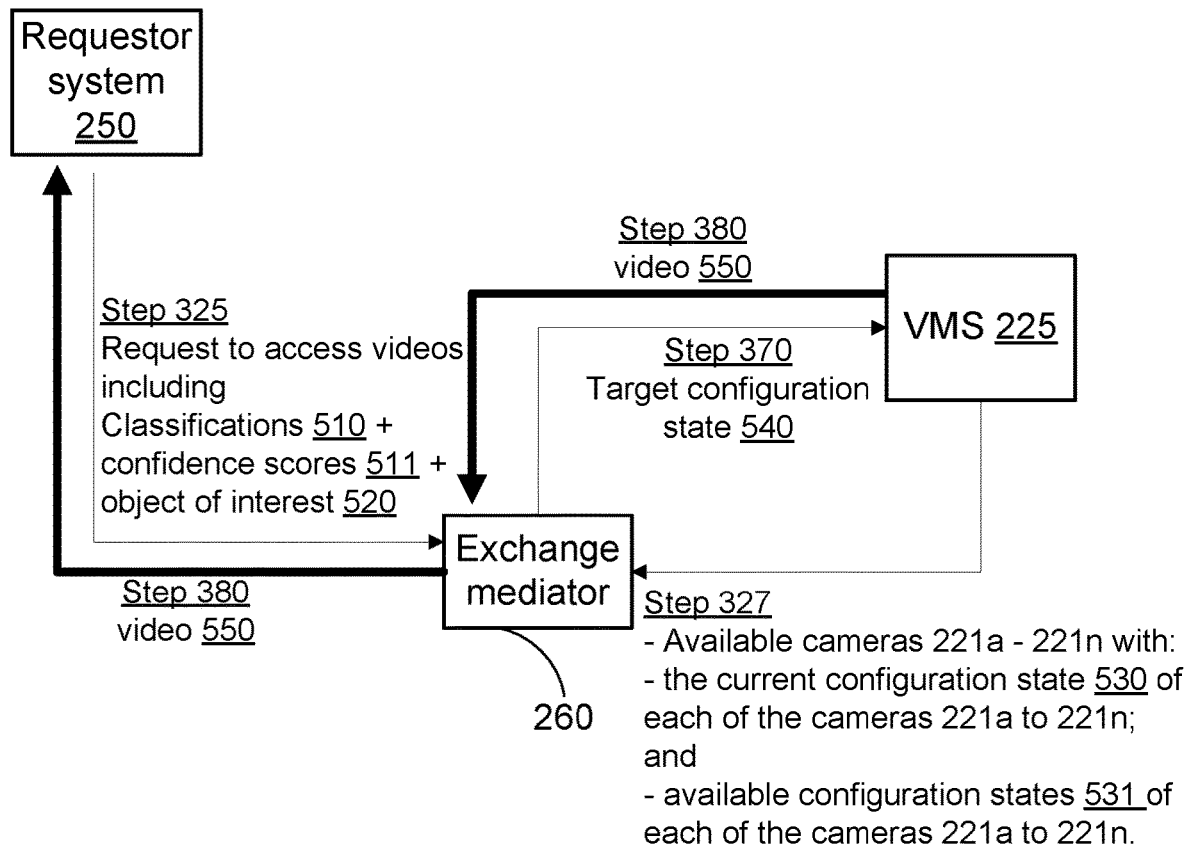
FIG. 4 is a schematic data flow diagram of the camera network systems of FIGS. 2A and 2B.

The method of providing access to videos may be implemented using the computer system 100 wherein the processes of FIGS. 3 and 4, to be described, may be implemented as one or more software application programs 133 executable within the computer system 100. In particular, the steps of the method of providing access to videos are affected by instructions 131 (see FIG. 1B) in the software 133 that are carried out within the computer system 100 (implemented as either the requestor system 250 or the exchange mediator 260). The software instructions 131 may be formed as one or more code modules, each for performing one or more particular tasks. The software may also be divided into two separate parts, in which a first part and the corresponding code modules performs the providing video access methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably affects an apparatus for the requestor system 250 or the exchange mediator 260.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably affects the requestor system 250 or the exchange mediator 260.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed requestor system 250 and exchange mediator 260 arrangements use input variables 154, which are stored in the memory 134 in corresponding memory locations 155, 156, 157. The requestor system 250 and exchange mediator 260 arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;
a decode operation in which the control unit 139 determines which instruction has been fetched; and
an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3 and 4 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The Method of Providing Access to Videos

FIG. 3 is a schematic flow diagram of a method 300 of accessing a video 550 (see FIG. 4) from video cameras 221 of the camera networks 220 of the system 200A or 200B. The method 300 will be described in relation to FIG. 4. The steps of the method 300, either performed by the requestor system 250 or the exchange mediator 260, may be implemented by one or more of software application programs 133, which are stored in the storage devices 109 and executable within the computer system 100.

The method 300 starts with a capturing an object of interest step 310 where a first camera 211 of the camera network 210 captures the object of interest 520 (such as a person, a vehicle, etc.).

In one arrangement, the step 310 is performed by the camera 211 and the requestor system 250. A user of the requestor system 250 identifies and tags the object of interest 520 using the input devices 102 and 103; and the display 114. The camera 211 then captures the tagged object of interest 520. Therefore, the object of interest is determined from a sequence of the video frames of the video captured by the camera 211.

In another arrangement, the camera 211 solely performs the step 310. In such an arrangement, the camera 211 is running a computer application program to automatically capture and track an object of interest 520. For example, the computer application program resident on the camera 211 is programmed so that the camera 211 captures and tracks a person 520 entering a monitored area.

It should be understood that where objects of interest are described, the events (e.g. a robbery, a murder, a festival) in which those objects of interest act are part of the information need as well. In addition, the manifestation of objects of interest is not necessarily static. For example, a fire or an oil spill could be an object of interest 520.

Step 310 is performed by the system 200A. However, when the system 200B is implemented, step 310 is not performed.

The method 300 then proceeds from step 310 to step 320.

In the classification determination step 320, the requestor system 250 analyses a video from the camera 211 (having a configuration state $V_0$) to determine n classifications $c_1$ to $c_n$ 510 (such as a person's trait (e.g., face, gait, other biometric information), appearance based identifiers (e.g., colour histogram, self-similarity), characteristics of group (e.g., crowd or traffic flow), and any other identification signatures) for the captured object of interest 520. Each classification 510 has a classification confidence score 511 stating the accuracy of the classification.

In an alternative arrangement, the camera 211 performs such an analysis and provides the determined classifications 510 and associated classification confidence scores 511 to the requestor system 250.

Step 320 is performed by the system 200A. However, when the system 200B is implemented, step 320 is not performed.

The method 300 then proceeds from step 320 to step 325.

In the request access step 325, the requestor system 250 transmits a request to the exchange mediator 260 to access videos of the second cameras 221 of the camera networks 220.

In one arrangement, such a request received by the exchange mediator 260 includes the object of interest 520, all the classifications 510 and associated classification confidence scores 511 (determined in step 320).

In an alternative arrangement, the requestor system 250 selects a classification 510 (e.g., face, gait, and any other identification signatures). For example, the classification 510 with the highest classification confidence score 511 is selected and included in the request.

In another alternative arrangement, the requestor system 250 selects a subset of classifications 510 (e.g., a subset of classification involving a person's trait such as face, gait, and the like). The subset of classifications 510 and associated classification confidence scores 511 are then transmitted in the request.

If the system 200B is implemented, the method 300 starts at step 325 and the requestor system 250 is provided with the classification 510 and classification confidence scores 511 from an external source. For example, the requestor system 250 receives the classifications 510 and the classification confidence scores 511 via the communications network 120 from a third party source (e.g., a consulting company).

Step 325 is shown in the data flow diagram of FIG. 4, where the classifications 510, the classification confidence scores 511 and the object of interest 520 are sent with the request to the exchange mediator 260.

In the request, the requestor system 250 may also provide to the exchange mediator 260 coordinates of an area relating to the object of interest, a financial budget for accessing the video, the task required (e.g., tracking a person) relating to the object of interest, information about the task (e.g., the determined classifications 510 and the associated classification confidence scores 511), and any other relevant information to perform the task required (such as the last known location, speed and direction of travel of the object of interest, accompaniment by other people or objects (e.g. trolley, dog).

The method 300 then proceeds from step 325 to step 327.

At step 327, the exchange mediator 260 requests the VMS 225 of the camera networks for available second cameras 220 and associated available configuration states 531 based on the classification 510 and information received at step 325. When receiving such a request, each of the VMS 225 of the respective camera networks 220 provides the available cameras 221 with the current configuration state 530 of each of the cameras 221 and available configuration states 531 of each of the cameras 221 to the exchange mediator 260.

For each available camera 221, there may be more than one available configuration state 531. For example, each available camera 221 may have one configuration state 531 with pan-tilt coordinates (+1.87, −0.23), another configuration state 531 with pan-tilt coordinates (−0.96, +3.04), and yet another configuration state 531 with the original pan-tilt coordinates but with a higher resolution of 1920×1080.

Step 327 is shown in FIG. 4 with data of the available cameras 221, the current configuration states 530 and available configuration states 531 being transmitted from the VMS 225 to the exchange mediator 260.

In an alternative arrangement, the available configuration states 531 and the available cameras 221 are stored in the exchange mediator 260 when the cameras 221 are registered. Further, each of the VMS 225 provides a periodical update on the current configuration state 530 of each of the cameras 221 to the exchange mediator 260. The step 327 does not need to be performed in the alternative arrangement.

Examples of the configuration states 531 are, inter alia, pan-tilt-zoom configurations, frame rate, resolution, compression factor 50%, bit rate), and infrared mode.

Therefore, step 370 determines available second cameras 221 that would be capable of meeting the classification, the classification confidence score and other information need received at step 325.

The method 300 proceeds from step 327 to step 330.

The decision step 330 is performed by the exchange mediator 260 after receiving the available cameras 221, the current configuration states 530 of the cameras 221 and associated configuration states 531 at step 327. The method 300 processes the received available cameras 221, the current configuration states 530 and associated configuration states 531 at steps 340 and 350. The method 300 selects a particular second camera 221 and an associated configuration state 531 at step 360 by using the results of steps 340 and 350. Step 330 therefore determines as to whether all available second cameras 221 have been processed at steps 340 and 350 before the method 300 proceeds to step 360.

Step 330 determines whether there are more second cameras 221 and associated configuration states 531 to be processed. If there are more second cameras 221 and configuration states 531 to be processed (YES), the method 300 proceeds from step 330 to steps 340 and 350 to process the available second cameras 221 and their associated configuration states 531. Otherwise (NO), the method 300 proceeds from step 330 to step 360 to select a particular second camera 221 and an associated particular configuration state 531.

In one alternative arrangement, step 330 computes price-quality combined scores based on the estimated classification confidence score (performed at step 340) and the adjustment cost value (performed at step 350) for the configuration states 531 of one camera 221. The price-quality combined score for one of the configuration states 531 is computed by dividing the estimated classification confidence score by the adjustment cost value, if the estimated classification confidence score is equal to or exceeding a minimum quality threshold, say 0.6. The price-quality combined score would be 0 if the estimated classification confidence score is below the minimum quality threshold.

If the price-quality combined score of a previous assessment is over a predetermined threshold, step 330 then proceeds to step 360. Thus, in the alternative arrangement, the method 300 proceeds to step 360 once a matching camera 221 with a suitable configuration state 531 is found. That is, the method 300 does not need to iterate steps 330 to 350 to estimate the classification confidence scores and the adjustment cost values for all configuration states 531.

The processing steps 340 and 350 of the available second cameras 221 will be described before describing the subsequent selection step 360. At step 340, the exchange mediator 260 estimates classification confidence score(s) (of the classification(s) provided at step 325) of the object of interest 520 for each available camera 221 at all associated configuration states 531.

The exchange mediator 260 commences by constructing a set of configuration states $V_y \in \{V_1, \ldots, V_m\}$ for one of the available cameras 221 received at step 327 (or, in the alternative arrangement described in relation to step 327, stored in the exchange mediator 260). Initially, all available camera states $V_1 \ldots V_m$ are marked as unprocessed.

The classification confidence score determination step 340 estimates an estimated classification confidence score for each classification for the object of interest 520 for an unprocessed second camera configuration state $V_y$. As the second camera 221 is not yet in the configuration state $V_y$, the estimate is based on previous observations in the configuration state $V_y$. The classification confidence scores are determined for all available configuration states 531 of the second camera 221.

For example, the classification transmitted at step 325 is face recognition (which has a classification confidence score of 70). At step 327, the exchange mediator 260 receives 3 second cameras 221, each having 4 configurations states 531. At step 340, classification confidence scores for face recognition are estimated for all 4 of the configuration states 531 for one of the second cameras 221. Based on previous observations, face recognition confidence scores at each of the four configuration states 531 of this particular second camera 221 are 30, 40, 50, and 60. The four estimated classification confidence scores are then outputted by the step 340. The other 2 of the second cameras 221 are processed in subsequent iterations of the steps 330 to 350.

The method 300 then proceeds from step 340 to step 350.

The adjustment cost value determination step 350 determines the adjustment cost values for adjusting the current configuration state 530 of a second camera 221 to the respective associated configuration states 531. Such cost values may be set by the respective owners of the second cameras 221.

After performing steps 340 and 350, all the configuration states $V_y$ of one of the second cameras 221 are marked as processed.

In another arrangement, the cameras 221 provide the estimated classification confidence score and the adjustment cost value through self-assessment. The exchange mediator 260 has to trust the self-assessment initially, but keeps a record of past self-assessments and the exchange mediator 260 assessment when the camera 221 was selected. After building a database of historical data, the exchange mediator 260 blacklists the cameras 221 with poor self-assessment, e.g. by not considering the supplier camera 221 when performing step 330, or normalises the self-assessment. The advantage of self-assessment is that the exchange mediator 260 does not have to gain access to the video of the camera 221.

The method 300 proceeds from step 350 to step 330.

As described hereinbefore, if all of the second cameras 221 have been processed, then the method 300 proceeds from step 330 to step 360.

At the camera configuration state selection step 360, the requestor system 250 selects one of the configuration states 531 of one of the second cameras 221. The selection is based on the estimated classification confidence score (determined at step 340) and the adjustment cost value (determined at step 350). At step 360, the exchange mediator 260 transmits the results of the steps 340 and 350 to the requestor system 250 to enable selection of one of the available cameras 221 and an associated configuration state 531.

For example, one of the configuration states 531 of one of the second cameras 221 has the highest classification confidence score of 75 with an adjustment cost value of $100, while another configuration state 531 has a classification confidence score of 60 with an adjustment cost value of $50. The requestor system 250 then selects one of these configuration states 531 depending on budget, importance of the information needed, and the like.

At step 360, the requestor system 250 also selects a lease period to provide the time period to access the video of the selected camera 221 at the selected configuration state 540. In one example, the requestor system 250 may need the camera 221 to determine traffic flow of an area at a specific time. Thus, the requestor system 250 would specify that specific time to lease the camera 221. Further, the lease period may also specify whether the access request is for a live video or a recorded video. The exchange mediator 260 then receives the lease period. In an alternative arrangement, the requestor system 250 selects the lease period at step 325 above.

The selection of the configuration states 531, the second camera 221, and the lease period is transmitted to the exchange mediator 260.

In another arrangement, a plurality of configuration states 531 (from different cameras 221) is selected to address the information need. For example, one camera 221*a* may cover half of an area to be monitored, while another camera 221*b* covers the other half of the area to be monitored. The estimated classification confidence scores are averaged and the adjustment cost values are added so that the selection step 360 can proceed in a similar fashion to the selection for a single configuration state 531.

The method 300 then proceeds from step 360 to step 370.

At supplier camera adjustment step 370, the exchange mediator 260 instructs the selected second camera 221 to change its current configuration state 530 to the selected configuration state 540 for the lease period. In a billing database of the VMS 225, the lease period is recorded so that a reimbursement fee can be computed and paid in a later stage by the user of the requestor system 250.

As shown in FIG. 4, the target configuration state 540 is provided to the VMS 225 to enable the VMS 225 to manage the adjustment of the selected camera 221 to the target configuration state 540 during the lease period.

The method 300 proceeds from step 370 to step 380.

At access providing step 380, the VMS 225 provides the requestor system 250 with access to the video 550 corresponding to the selected configuration state (also known as target configuration state) 540 in accordance with the submitted lease period information.

As shown in FIG. 4, the video 550 is provided from the VMS 225 to the requestor system 250 via the exchange mediator 260.

In an alternative arrangement, the requestor system 250 gets access to features derived from the video 550. The features, e.g. edge maps, foreground separation, or object signatures, are then used for further processing to achieve information (e.g., people counting or object tracks) derived from the video 550. The advantage of supplying features instead of video frames is that bandwidth for the communication of the video 550 is reduced. Also, privacy concerns about the sharing of video 550 are addressed. The advantage of supplying features instead of analysis information derived from video 550 is that the requestor system 250 can use its own analysis modules to derive the analysis information, and that new versions of the analysis modules can be applied on old feature data in the future to update interpretations of historical data.

The method 300 then concludes 399.

In one embodiment, after the lease period has expired, the supplier camera 221 returns to its original state, unless a new lease period was purchased as described above. In another embodiment, the exchange mediator 260 establishes that the classification in the target configuration state 540 was completed successfully, e.g. with a classification confidence score exceeding a threshold, and ends the lease period.

Embodiment 1

In an example embodiment of the system 200A, a police dispatch system (i.e., the camera network 210) operates council surveillance cameras (i.e., the cameras 211) via the VMS 215 and a dispatch control system (i.e., the requestor system 250). Typically, the police have an agreement with councils to get access to the council surveillance cameras 211 and the VMS 215.

In an example event, a control room operator receives a phone call about an incident at a location. The control room operator inputs the location coordinates into the dispatch control system 250 and views the council surveillance cameras 211 at the relevant location. In a viewpoint of one of the cameras 211, the operator notices a person of interest 520 who is suspected to be involved in the reported incident and tags the person of interest 520, as described at step 310 of the method 300 above.

Tagging the person of interest 520 could be performed by using a mouse 103 or touch screen (not shown) to draw a rectangle (bounding box) around the person of interest 520. The police dispatch control system 250 then starts tracking the person of interest 520 on one of the cameras 211 (e.g., the camera 211*a*). When the person of interest 520 is near the left boundary of the viewpoint of the camera 211*a*, the police dispatch control system 250 instructs the camera 211*a* to pan to the left to track the object of interest 520.

As described in step 320, the dispatch control system 250 determines classifications 510 and associated classification confidence scores 511 of the captured object of interest 520. In this example, the dispatch control system 250 is configured to use a colour histogram, self-similarity and face recognition for the classification of the object of interest 520 using the camera 211a. The dispatch control system 250 then determines the classification confidence scores of the colour histogram, the self-similarity and face recognition. An example of the classification confidence score for the colour histogram is 0.52, the classification confidence score for the self-similarity is 0.34, and the classification confidence score for the face recognition is 0.2.

The control dispatch system 250, in this example, has a predetermined classification confidence score threshold of 0.5. Based on the threshold, the colour histogram classification is used for tracking the object of interest 520.

When the object of interest 520 leaves the full viewable scope of the council camera 211a, the dispatch control system 250 continues tracking the object of interest 520 using one of the other cameras 211b to 211n. The dispatch control system 250 first compares the colour histogram signature of each of the other cameras 211b to 211n to the colour histogram signature of the camera 211a (i.e., the classification used for tracking the object of interest 520). When a match of the colour histogram signature is made (e.g., from the camera 211b), tracking of the object of interest 520 is performed by the camera 211b. Meanwhile, the operator provides the location of the object of interest 520 to dispatch police officers, or the location is provided automatically by the dispatch control system 250 to a tablet device in the patrol cars responding to the incident.

At some point, the person of interest 520 is outside the full viewable scope of all council cameras 211 in the camera network 210. In one example, the person of interest 520 enters a private property, such as a shopping centre, where the police dispatch control system 250 does not have access to the cameras in the shopping centre.

When the person of interest 520 leaves the full viewable scope of the council cameras 211, the dispatch control system 250 requests the exchange mediator 260 to access videos of other camera networks 220 for tracking the object of interest 520, as described in step 325. In this example, the dispatch control system 250 sends the colour histogram classification and the related classification confidence score to the exchange mediator 260.

The police dispatch control system 250 also provides coordinates to the exchange mediator 260. In this example, the exchange mediator 260 stores the available cameras 221 and the associated available configuration states 531 (see the alternative arrangement of step 327). Therefore, the exchange mediator 260 responds to the request from the dispatch control system 250 that there are private cameras 221 registered to the exchange mediator 260 which can serve as supplier cameras to provide videos at the provided coordinates. The police dispatch control system 250 also provides the exchange mediator 260 with a financial budget to track the person of interest 520 further based on the incident code (e.g., $100 for a murder and $25 for a robbery). The police dispatch control system 250 also provides the exchange mediator 260 with the task required, namely tracking of a person, and information about the task, namely the colour histogram signature of the person of interest 520, the location and time of the last observation, and the speed at which the person of interest 520 was travelling.

The exchange mediator 260 then compiles the available second cameras 221 and associated configuration states 531 based on the last observed location and the travel speed of the person of interest 520. For example, given a location near the West entrance of the shopping centre 1 minute ago, and a walking speed of 8 kilometres per hour, the exchange mediator 260 adds the possible configuration states 531 of all cameras 221 located within a 250 metre radius of the West entrance to the list of available configuration states 531. A mapping between supplier cameras 221 and the available configuration states 531 has been defined during setup of the system 200A.

The method 300 then proceeds to step 330 to determine whether there are any cameras 221 to process. The method 300 iterates the steps 330 to 350 to estimate classification confidence scores of the classifications (as used by the second cameras 211 at step 320) for the available configuration states 531 for each of the cameras 221 and the adjustment cost value of each camera 221 to adjust from the current configuration state 530 to each of the available configuration states 531.

One example of step 340 being performed for one of the available configuration states 531 of one of the cameras 221 is now described. The example for performing steps 340 and 350 will be described with reference to one of the cameras 221a for ease of description. The camera 221a may be monitoring activities within a clothing store in its current configuration state 530. However, the full viewable scope of the camera 221a was registered with the exchange mediator 260 and one of the available configuration states 531 includes the concourse of the shopping centre, within the established 250 m radius of the West entrance of the shopping centre. The exchange mediator 260 estimates a classification confidence score of a colour histogram classification for the available configuration state 531 covering the concourse of the shopping centre. In this example, the exchange mediator 260 estimates a classification confidence score of 0.75 for the colour histogram classification for the configuration state 531 covering the concourse.

The classification confidence score is estimated by taking the previous trajectory of the object of interest 520 (as provided by the requestor system 250) into account, as well as a precomputed map $M_s$ of the observed area (i.e., the concourse of the shopping centre) for that available configuration state 531. The classification confidence score indicates the probability that the object of interest 520 can be classified according to the colour histogram classification using that available configuration state 531 covering the concourse of the shopping centre.

Each video frame in the viewpoint of the available configuration state 531 covering the concourse is divided into grids (e.g., a 10×6 grid cells). The direction and speed from the previous trajectory are used to find a centre point in the grid for a time in the future, say 5 seconds from the current time. A 2D Gaussian function is then applied to get an estimated classification confidence score for each of the grid cells, which is indicative of the probability that the object of interest 520 appears in the grid cell 5 seconds from now. The grid cell corresponding to centre point is set to be the origin of the 2D Gaussian function. The standard deviation of the 2D Gaussian function is set to the previously observed speed of the object of interest 520 (in metres per second) multiplied with a speed weight, say 0.4. For each of the grid cells, the Gaussian score for the grid cell is multiplied with the precomputed object classification map $M_s$ value at the grid cell, resulting in a set of future classification scores indicative of the probability that the object of interest 520 is classified at a grid cell location 5 seconds from now. The estimated classification confidence score then is the maximum value of the set of future classification scores.

The above estimation of classification confidence score step 340 is performed for the remaining available configuration states 531 of the camera 221a in one iteration. In subsequent iterations of step 340, for each of the remaining cameras 221, estimated classification confidence scores are calculated for the respective available configuration states 531.

At the next step 350, the exchange mediator 260 determines the adjustment cost value to change the current configuration state 530 of the camera 221a to the configuration state 531 covering the concourse. In one arrangement, the clothing store owner has indicated beforehand that the configuration state 531 covering the concourse has no value to the store owner. The value of the current configuration state 530 of the camera 221a depends on the activity in the store. Analysis of sensor data streams, particularly classifying people in the scene, is used to measure the activity. In one example, a door sensor is used to determine the number of entry events and exit events caused by opening the door. The number of people in the shop equals the number of entries minus the number of exit events. In a similar way, a motion sensor is used to detect entry and exit events at the locations where the motion sensor is placed. An entry/exit event is triggered when the amount motion exceeds a threshold, say 10%, in a corresponding direction. In a similar way, an infrared sensor is used. An event is triggered when the infrared beam is interrupted. In another example, the temperature in the shop is compared to a baseline temperature. The difference in temperature is divided by a constant, say 0.1 degrees, to get an estimate of a change of the number of people in the shop. In yet another example, video analysis is used to detect human bodies, e.g. using a Histogram of Oriented Gradients (HOG) to find head-and-shoulder shapes in the image. The estimated number of people is the number of detected head-and-shoulders detected in the images from all non-overlapping cameras in the shop. One of the images is provided by camera 221a in current configuration state 530. Based on the estimate of the number of people: if no people are in the store, the predefined value is $0.10; for 1 to 5 people in the store, the predefined value of monitoring their activities is $3.00; and for over 5 people, the predefined value is $7.00. As the system 200A is using the alternative arrangement of step 327, the value of the current configuration state 530 is provided periodically to the exchange mediator 260. In the previous periodical update, the camera 221a communicated to the exchange mediator 260 that the people counting module on the camera 221a was observing 3 people. Therefore, the exchange mediator 260 determines an adjustment cost value of $3.00.

In another arrangement, the clothing store owner has indicated beforehand that the configuration state 531 covering the concourse (area of interest of the requestor system 250) has a value to the store owner during shop opening times. In the arrangement, the value depends on activity within the scene, measured by the number of pedestrians on the concourse, say $0.00 for 0 pedestrians, $0.50 for 1 to 10 pedestrians, and $1.00 for more than 10 pedestrians. As the number of pedestrians may be unknown at the time of estimation, statistics from historical scene classification data are used, say 7 pedestrians on average at 3 pm on Thursdays when the weather forecast predicts a 70% chance of rain, to determine the value of $0.50 for the configuration state 531 covering the concourse. Similar to the example where the value of the current configuration state 530 is $3.00, the exchange mediator 260 determines an adjustment cost value of current configuration state 530's value minus configuration state 531's value, i.e. $3.00-$0.50=$2.50.

In another arrangement, the activity in the scene is measured through the level of attention required or a degree of suspiciousness. Measuring the activity is done through analysis of sensor information. In one example, a face recognition system has identified a shop visitor as being on a list of known shoplifters, and the shop visitor is in the view of the current configuration state 530 of the camera 221a, or is expected to show up in the view shortly. The value of the current configuration state 530 is then set to a high amount, say $50, as surveillance footage may serve as evidence in a court case against the shoplifter. In another example, an age classification system has determined that there are many (say 10) shop visitors with an age over 70. The risk of a fall is high, and monitoring the shop visitors allows a fast response to such falls. The value of the current configuration state 530 is then set to a predetermined amount, say $3 times the number of visitors over 70, reflecting the attention the shop wants to give to the safety of its customers, In yet another example, the attention required relates to the customer service of the shop. If a customer tracking systems indicates that all customers are moving through the shop in a consistent direction (i.e. forwards), with a reasonable walking speed, say 4 km per hour, customer service attention levels can be low, and the adjustment cost value is low, say $0.25. If one or more customers are moving around in unusual patterns (e.g. back and forth), it is an indicator that they may be in need of customer service. In that case, further monitoring is desirable, and the adjustment cost value is set higher, say $1.50 multiplied by the number of customers moving around in unusual patterns.

In another arrangement, the adjustment cost value is determined based on the degree of completion of an analysis task performed on the video captured by camera 221a. For example, a shop is interested in the behaviour of men buying lipstick. As a majority of the customers are women, video samples with men are rare. If historically 1 man per day enters the shop, and in the current view captured by configuration state 530 of the camera 221a a man is observed, using gender classification video analysis, the value of the recording is high, and the adjustment cost value is set to say $3.00. If a sufficient number of samples, say 20, have been recorded already, the adjustment cost value drops, say to $0.75. In a similar way, a statistical confidence level is used to determine the completion of a task. For example, a hypothesis is tested that in a renovated store layout, customers spend on average more than 5 minutes in aisle 3. A video based analysis detects how long customers are spending in aisle 3, and also how many customers visit the store. If 10 customers have been observed, and their average dwell time in aisle 3 is 6 minutes with a standard deviation of 2.5 minutes, the confidence level for the hypothesis is approximately 80%. If the required confidence level is 95%, more samples are needed, and the adjustment cost value is high, say $1.55. If 20 customers have been observed, and their average dwell time in aisle 3 is 6 minutes with a standard deviation of 2 minutes, the confidence level for the hypothesis is exceeding 95% slightly. Although further samples from the current view captured by configuration state 530 of the camera 221a would increase the confidence level, the further samples are unlikely to have impact, and the adjustment cost value is low, say $0.05. Alternatively, a formula for the degree of completion of the analysis task is used to compute the adjustment cost value: $0.05+max{0,(95−ccl)

*$0.10} where ccl is the current confidence level (i.e. based on the video observed until the current moment) that the aisle 3 dwell time is 5 minutes or higher.

The above steps 340 and 350 are repeated for all cameras 221 and the associated available configuration states 531 that are relevant to the established 250 metre radius of the West entrance of the shopping centre.

In one arrangement, availability of all cameras 221a-221n, from the same provider or from a variety of providers, is considered when considering the adjustment cost value of a single camera 221a. For each camera from the plurality of cameras 221b-221n $cam_{support}$ which can fulfil the same task as camera 221a $cam_{target}$, the adjustment cost value is computed for changing the configuration state of at least one of the cameras 221b-221n $cam_{support}$ to a configuration state that allows the task of camera 221a $cam_{target}$ to be performed, e thereby freeing up camera 221a $cam_{target}$ to change to configuration state 531. The adjustment cost value of camera 221a $cam_{target}$ is then changed to the minimum of the originally computed adjustment cost value of camera 221a $cam_{target}$ and the adjustment cost value of camera 221 $cam_{support}$. The process of delegating tasks from one camera to another camera can be applied recursively, that is for the scenario where camera 221c takes over the task of camera 221b, and camera 221a takes over the task of camera 221a. In a sparse camera network, the recursions will end quickly because the condition that a camera can take over a task from another camera is unlikely to be met often. In a dense camera network, a maximum number of recursions, say 5, is imposed for practical (computational) reasons. Similarly, in another arrangement, the task of camera 221a requires multiple cameras from the plurality of cameras 221b-221n to take over its task jointly. In that case, the adjustment cost value of camera 221a $cam_{target}$ is changed to the minimum of the originally computed adjustment cost value of camera 221a $cam_{target}$ and the sum of the adjustment cost values of cameras selected from the plurality of cameras 221b-221n to take over the task of camera 221a.

As described above, there is an alternative arrangement where step 330 computes a price-quality combined score based on the estimated classification confidence score (performed at step 340) and the adjustment cost value (performed at step 350) for each configuration states 531 of the camera 221a covering areas within the 250 metre radius of the West entrance of the shopping centre. The price-quality combined score for one of the configuration states 531 is computed by dividing the estimated classification confidence score by the adjustment cost value, if the estimated classification confidence score is equal to or exceeding a minimum quality threshold, say 0.6, and 0 if below the minimum quality threshold. For example, the price-quality combined score is 0.75/$3.00=0.25 for the camera 221a discussed above.

If the price-quality combined score of a previous assessment is over a threshold, say 0.5, the method 300 proceeds to step 360 and no further available configuration states 531 of the remaining cameras 221b to 221n need to be assessed. For example, the outcome of the assessment is that the estimated classification confidence score is 0.7, the adjustment cost value is $2, and the price-quality combined score is 0.35.

Once all the relevant configuration states 531 have been processed, or a suitable price-quality combined score is determined, the method 300 proceeds to step 360.

At step 360, the dispatch control system 250 determines the trade-off between the estimated classification confidence score and the adjustment cost value for the processed configuration states 531 and selects one of the configuration states 531. In the alternative arrangement, the exchange mediator 260 selects the configuration state 531 with the suitable price-quality combined score. If there are multiple configuration states 531 with the same price-quality combined score, the configuration state 531 with the lowest adjustment cost value is selected. In another arrangement, the provided budget guides the selection.

In one arrangement, the dispatch control system 250 selects one or more of the configuration states 531 for tracking the person of interest, where the selection of the configuration states 531 is determined by a budget assigned to accessing the video. For example, the tracking of the person of interest is relating to a murder case where a budget of $100 has been assigned for a period of 30 minutes. If 5 minutes have elapsed, 3 configuration states 531 have been selected and a total payment of $18 (i.e., the adjustment cost values plus a premium) has been spent, the estimated required number of camera states for the remaining 25 minutes based on the selected configuration states 531 in the previous 5 minutes is $$\frac{\text{estimated configuration states}}{\text{estimated time}} \cdot (\text{total time} - \text{time elapsed}) = \text{estimated required number of configuration states}$$

where estimated configuration states is determined from the configuration states used in the elapsed time, which in this example is 3 configuration states;
estimated time is the estimated time to use the estimated configuration states, which in this example is 5 minutes;
total time is the total time assigned for tracking the person;
time elapsed is the time that has elapsed in tracking the person; and
estimated required number of configuration states is the estimated number of configuration states to be used in the remaining time.

Therefore, in this example, the number of estimated number of configuration states to be used in the remaining 25 minutes is $3/5 \cdot (30-5)=15$ configuration states. The remaining budget of ($82) is then divided by the estimated required number of configuration states, and corrected for a premium on the adjustment cost value, say 10%, to be paid to the owners of the camera networks 220 and the owner of the exchange mediator 260, so that the estimated available budget for accessing a video from each of the estimated required number of configuration states is:

$$\frac{100-18}{15} \cdot \frac{1}{1.1} = \$4.97.$$

Based on this arrangement, the dispatch control system 250, at step 360, selects one of the cameras 221 with a configuration state 531 with the highest estimated classification confidence score while not exceeding $4.97 in adjustment cost value.

The method 300 then proceeds from the selection step 360 to step 370.

At step 370, the exchange mediator 260 notifies the selected camera 221 that the transaction has been approved, and transmits adjustment instructions to the selected camera 221. In the example, the PTZ coordinates of the camera 221a are adjusted, resulting in an expected view on the person of interest 520.

The method 300 then proceeds to step 380.

In one arrangement, access is provided at step 380 to the control dispatch system 250 as soon as the instructions in step 370 are given to the camera 221a. In another arrangement, access is provided after a predetermined time period has elapsed from the time the instructions were given, to allow for the adjustment to take place. The predetermined time period is an estimate of the transition time, e.g. as documented by the supplier or calculated from previous similar transitions. In yet another arrangement, the camera 221a provides a notification when the camera 221a has completed transition to the target configuration state 540.

The exchange mediator 260 then provides access to the video from the selected adjusted camera 221a. In one arrangement, login credentials to the supplier camera 221a are provided so that the control dispatch system 250 has direct access to the video content. In another arrangement, the exchange mediator 260 has login credentials as a trusted third party, and forwards the video from the camera 221 to the dispatch control system 250 via the VMS 225. The dispatch control system 250 then has access to the video indirectly, but the dispatch control system 250 does not have access to the camera 221a. In yet another arrangement, the requestor [2]50 gets a guest account on the video management system (VMS) [2]25 of the owner of the supplier camera [2]21, with access to the live and recorded camera footage for the specific camera stream and the specific time slot (i.e., the time slot for which a fee was paid).

Embodiment 2

In another example scenario, a council wants to observe pedestrian traffic in a shopping precinct. Dispatching council staff to count pedestrians is an expensive and tedious exercise, which can be done once a year only because of budget constraints. Because of these constraints, the manual count does not provide information about counting differences between sunny and rainy days, weekends, weekdays and public holidays, etc. Collaborating with a statistician, the council has made a list of situations that need to be covered, the regions of interest in the shopping precinct, and the number of measurements (i.e., classifications) needed for each situation.

In this scenario, the council does not have sufficient surveillance cameras 211 in the area, but many local shops do have surveillance cameras 221 to observe shoplifting during the day and alert to burglaries at night. Alternatively, the council does not operate any cameras 211 as depicted in FIG. 2B. In this example, the system 200B is used where the council operates a requestor system 250 (which could be an application program 133 being executed on the computer system 100) to access videos of the camera networks 220, which are owned and operated by local shops registered with exchange mediator 260.

As described above in relation to method 300, the system 200B commences the method 300 at step 325. In this example, a classification determined by the council is a crowd flow (direction and magnitude of pedestrian streams), which is an interpretation of the pixel information rather than the raw pixels of the videos. The crowd flow is computed by applying optic flow to the pixels in the video frames, resulting in vectors with an origin, a direction, and a magnitude. From a histogram of several optic flow vectors, the general pedestrian crowd flow is computed. The crowd flow classification is transmitted to the exchange mediator 260 at step 325.

At step 325, the council also selects lease periods, which the council has done based on the list of situations and the required number of measurements. In one arrangement, the council is checking weather reports on an hourly basis and provides an updated lease period to the exchange mediator 260. For example, more measurements on a rainy day are needed and the council submits an updated lease period to access the videos longer. The council may find that the weather report indicates rain during the next hour and selects the time slot of the next hour for attempting to access the videos of the cameras 221 in the shopping precinct. In another arrangement, the council uses a calendar to select a time slot on weekdays, weekends and holidays, and the council's event calendar for special events.

At step 327, based on the lease period, the exchange mediator 260 compiles a list of second cameras 221 that have been registered with exchange mediator 260. In one arrangement, the owners of the camera networks 220 have indicated privacy settings. Some owners allow the whole video to be used, while other owners allow use of derivative information only, such as optic flow or people counts, which does not identify individual shoppers. The exchange mediator 260 compiles the list based on the required information need and the restriction set by the owners of the camera networks 220. In the example, council's information need is derivative information, and all available cameras 220 and associated available configuration states 531 are included in the list.

At step 330, initially, no configuration states 531 have been assessed, and the assessment continuation decision step 330 determines that more configuration states 531 should be assessed. A camera 221 is arbitrarily picked from the list to assess the available configuration states 531 at steps 340 and 350.

Step 340 estimates the classification confidence scores of the available configuration states 531 of the camera 221 (which is selected at step 330 immediately above). In the example, sa configuration state 531 is better suited if the configuration state 531 provides a top-down view and/or a wide angle view, while side views are less suitable. A precomputed map $M_s$ with scores between 0 and 1 for each cell in a grid on the video frame is used to determine the suitability of a cell for the information need. The estimated classification confidence score is the average of the scores.

At step 350, the exchange mediator 260 then determines the adjustment cost value, as previously described in embodiment 1.

When all configuration states 531 have been assessed at steps 330 to 350, the method 300 proceeds to step 360. At step 360, one of the configuration states 531 is selected based on classification score and adjustment cost value. In the alternative arrangement, as described in embodiment 1, the configuration state 531 with the most suitable price-quality combined score is selected.

For example, the configuration state 531 with an estimated classification confidence greater than a predefined minimum confidence score, say 0.8, and the lowest adjustment cost value below a predefined maximum cost, say $10, is selected. If none of the configuration states 531 satisfies the conditions, none of the configuration states 531 is selected and the exchange mediator 260 will try again in a future time slot defined by the lease period. If the exchange mediator 260 fails to perform the selection step 360 in the region more than a predefined number of times, say 10, a notification is sent to the requestor system 250 offering the opportunity to change the minimum classification confidence score or the maximum adjustment cost value for future attempts.

In this example, the selected camera is the camera 221a for ease of description.

The method 300 proceeds to step 370 when a configuration state 531 is selected.

At step 370, the selected camera 221a is adjusted to the target configuration state 540. The requestor system 250 now has access to the videos from the camera 221aa via the VMS 225. In the example, the information in the form of pedestrian flow information is derived from the accessed videos. Alternatively, the exchange mediator 260 may contain an application program 133 to derive the information required by the councils and provide the information, rather than the videos, to the requestor system 250.

As the information is not immediately needed by the requestor system 250, the information may be stored on a cloud storage service, and statistical reports are generated and presented to the council, when sufficient measurements have been stored.

In one arrangement, an analysis module runs on the acquired pedestrian flow information. Immediate analysis shows that there is a high magnitude pedestrian flow towards the North-West of the precinct. Comparison with historical data shows that the flow is unusual for the data set collected so far. Therefore, it is valuable to find out what the destination of the flow is. The requestor system 250 then selects a new region, based on the coordinates of the end of the flow within the view of the adjusted camera 221. The requestor system 250 then transmits a request to the exchange mediator 260 to access videos of other cameras 221 to monitor the new region (as described at step 325). The request includes the location of the new region, the classification (which in this case is the crowd flow classification) and the classification confidence score. The exchange mediator 260 then performs steps 330 to 350 to find the cameras 221 based on the location of the new region, to then find one of the cameras 221 with a configuration state 531 capable of observing a continuation of the flow observed in the selected camera 221a above.

At step 340, the exchange mediator 260 uses a precomputed map $M_s$ with scores between 0 and 1 for each cell in a grid on an image, as described in embodiment 1 above. A 2D Gaussian function is then applied to get a score for each of the grid cells, which is indicative of the probability that the optic flow vectors in the grid cell correspond to the dominant optic flow vector (i.e. the optic flow vector with the highest frequency in the histogram), as observed in the crowd flow classification of the selected camera 221a above. The grid cell corresponding to the point closest to the end of the dominant optic flow vector is set to be the origin of the 2D Gaussian function. The standard deviation of the 2D Gaussian function is set to the magnitude of the dominant optic flow vector (expressed in number of grid cells). For each of the grid cells, the Gaussian score for the grid cell is multiplied with the precomputed object classification map $M_s$ value at the grid cell, resulting in a set of future classification scores indicative of the probability that the related optic flow is measured at that location. The estimated classification confidence score then is the average value of the set of future classification scores.

Step 350 is performed in a similar fashion as described above. At step 360, one or more of the configuration states 531 are selected. In this embodiment, each of the configuration states 531 are assigned with different threshold adjustment cost values depending on how valuable the expected information is. That is, a higher threshold adjustment cost values are assigned to more valuable expected information. The selection of the configuration states 531 can then be performed using the threshold adjustment cost values corresponding to the configuration states 531. For example, a configuration state 531 with an adjustment cost value (for example, $10) below the corresponding threshold adjustment cost value (for example, $20), and having the highest estimated classification confidence greater than a predefined minimum confidence score (for example, 0.8) is selected.

In one arrangement, access to the video of the previously selected camera 221a is terminated to avoid further costs, if the subsequently selected configuration state 531 does not correspond to the camera 221a. The assumption is made that a similar pedestrian flow remains for some time, and that information provided by the previous and current cameras 221 can be merged to provide a full picture of the pedestrian flow. In another arrangement, where the previously selected camera 221a is not the same as the subsequent selected camera 221 (for example, 221b), information from both configuration states 540 of both cameras 221a and 221b is accessed simultaneously to get an accurate record of the pedestrian flow.

Embodiment 3

In a residential scenario, residents in a neighbourhood sign up to a neighbourhood watch scheme. Traditionally, neighbours take turns with patrols and generally watch out for suspicious activity. With the system 200A or 200B, the neighbourhood watch can be extended to the private camera networks 220 of each house in the neighbourhood. An incentive for sharing private camera networks 220 may not be needed, as the owners share common objectives, viz. security in the neighbourhood. However, owners may feel their privacy is violated if videos of video cameras 221 are shared continuously. In this scenario, the primary purpose of the exchange mediator 260 is to determine a security threat level, and enable sharing of the videos only if the security threat level exceeds a security threat threshold set by the camera network owner. Some camera network owners set a low security threat threshold, e.g. 6 on a scale from 1 to 10, because they value the security the neighbourhood watch provides. Other camera network owners set a high security threat threshold, e.g. 8, because they value their privacy relatively more. In one arrangement, the VMS 225 adapts the security threshold based on the activity in the cameras and the time of day. If there is no activity during the day, the security threat threshold is set to 4. At night, the security threat threshold is set to 6. In other cases, the security threat threshold is set to 8.

When the exchange mediator 260 determines a security threat in the neighbourhood, e.g. by detecting suspicious behaviour such as loitering (say security threat level 5) or detecting gun shots (say security threat level 10), two types of alert are triggered. The first alert is sent to the owner of the private camera network 220 to inform that access to camera network 220 is going to be shared. The owner has the opportunity to override the exchange mediator 260. The second alert is sent to the members of the neighbourhood watch to ask them to investigate the threat. In one arrangement, there is a delay between the two alerts, say 2 minutes, to give the private camera network 220 owner the opportunity to override the sharing. A member of the neighbourhood watch responds to the alert, and checks for security issues. If there are no issues, the member indicates to the exchange mediator 260 that the sharing of private camera network 220 can be stopped. The owner of private camera network 220 is informed that privacy settings are back to normal, and other neighbourhood watch members are informed that the alert has been attended to.

Utility

The system 200A or 200B provides access to videos from private sensor networks 220 that is otherwise not available to parties who need information from the private sensor networks 220 by giving the sensor network owner the incentive to share content through a reimbursement of the adjustment cost value and a premium. If the private sensor network 220 owner's own operations are more important, this is reflected in the adjustment cost value. This allows the private sensor network 220 owner to optimise use of the sensors 221 in the network 220 by selling the access to the sensors 221 when they are not needed by the owner. The party with an information need is more likely to get the information required when getting access to the private network 220. As the system 200A or 200B operates without human intervention after an initial setup (e.g. to define the information need and to define the value of regular operations), the sharing is done timely and based on what is happening in the scene without further operational overheads.

The claim(s) defining the invention are as follows:

1. A computer implemented method of accessing a video captured by a video capture device, said method comprising:
   receiving a request to access the video, the request including information relating to an object of interest;
   determining a confidence score of the object of interest being captured by the video capture device;
   determining a cost associated with adjusting the video capture device from an initial configuration state to at least one of adjusted configuration states, wherein the cost is determined using at least one of a value of the initial configuration state to a provider of the respective video capture device and a value of a particular adjusted configuration state to the provider; and
   providing access to the video from the video capture device using the at least one of adjusted configuration states based on the confidence score and the cost.

2. The method according to claim 1, further comprising:
   determining the object of interest observed in a video captured by another video capture device;
   selecting one of a plurality of classifications as the information relating to the object of interest; and
   transmitting the request with the selected classification.

3. The method according to claim 2, wherein the classification is selected based on the highest confidence score.

4. The method according to claim 1, wherein the object of interest is any one of a person, pedestrian flow, fire, and oil spill.

5. The method according to claim 1, wherein the information relating to the object of interest is any one of face recognition, gait recognition, colour histogram, self-similarity, and crowd flow.

6. The method according to claim 1, wherein the video capture device comprise a Pan-Tilt-Zoom (PTZ) camera.

7. The method according to claim 1, wherein the at least one of adjusted configuration states of the video capture device comprises any one of PTZ coordinates of the video capture device, frame rate of the video capture device, resolution of the video capture device, compression factor of the video capture device, bit rate of the video capture device, and infrared mode of the video capture device.

8. The method according to claim 1, further comprising:
   receiving a lease period for accessing the video, wherein access to the video is provided in the lease period.

9. The method according to claim 1, wherein features of the accessed video are provided.

10. The method according to claim 1, wherein the value of the initial configuration state is determined based on activity within a scene captured by the video capture device in the initial configuration state.

11. The method according to claim 10, wherein activity within the scene comprises at least one of metadata related to a number of people in the scene and a level of attention required to the scene.

12. The method according to claim 10, wherein activity within the scene is determined by analysing a video captured by the video capture device in the initial configuration state.

13. The method according to claim 10, wherein activity within the scene is determined using metadata related to the scene received from a sensor associated with the scene, the sensor being at least one of the following sensors: a motion sensor, a door sensor, an infrared sensor.

14. The method according to claim 1, wherein the cost is determined by classifying a scene associated with the initial configuration state and selecting a predetermined cost based on the classifying.

15. The method according to claim 1, wherein the cost is determined using historical scene classification data.

16. The method according to claim 1, wherein the cost is determined based on a degree of completion of a task of the video capture device associated with the initial configuration state.

17. The method according to claim 1, wherein the cost is determined based on an extent to which at least one other accessible video capture device is able to fulfil a task of the video capture device associated with the initial configuration state.

18. A system of providing access to video, the system comprising:
   a requestor system;
   an exchange mediator in communication with the requestor system; and
   a plurality of camera networks, each sensor network having a plurality of video capture devices, wherein each camera network is in communication with the exchange mediator,
   wherein the system is configured for:
     receiving, by the exchange mediator, a request to access the video from the requestor system, the request including information relating to an object of interest;
     determining, by the exchange mediator, available video capture devices of the camera networks based on the received request;
     determining, by the exchange mediator, a confidence score of the object of interest being captured by at least one of the video capture device;
     determining, by the exchange mediator, a cost associated with adjusting the at least one of the video capture devices from an initial configuration state to at least one of adjusted configuration states; and
     providing the requestor system with access to the video from the at least one of the video capture devices using the at least one of adjusted configuration states based on the confidence score and the cost.

19. The system according to claim 18, wherein the system is further configured for:

determining, by the requestor system, the object of interest observed in a sequence of video frames captured by another video capture device;

selecting, by the requestor system, one of a plurality of classifications based on a comparison of a corresponding classification confidence scores with a predetermined threshold; and transmitting, by the requestor system, the request with the selected classification and the corresponding classification confidence score.

20. The system according to claim 18, wherein the object of interest is any one of a person, pedestrian flow, fire, and oil spill.

21. The system according to claim 18, wherein the information relating to the object of interest is any one of face recognition, gait recognition, colour histogram, self-similarity, and crowd flow.

22. The system according to claim 18, wherein the video capture devices comprise a Pan-Tilt-Zoom (PTZ) camera.

23. The system according to claim 18, wherein the adjusted configuration states of the at least one of the video capture devices comprise any one of PTZ coordinates of the video capture device, frame rate of the video capture device, resolution of the video capture device, compression factor of the video capture device, bit rate of the video capture device, and infrared mode of the video capture device.

24. The system according to claim 18, further comprising:
receiving, by the exchange mediator, a lease period for accessing the video from the requestor system, wherein access to the video is provided to the requestor system in the lease period.

25. The system according to claim 18, wherein features of the accessed video are provided to the requestor system.

26. The system according to claim 19, wherein the classification is selected based on the highest confidence score.

27. The system according to claim 18, wherein the cost is determined using at least one of a value of the initial configuration state to a provider of the respective video capture device and a value of a particular adjusted configuration state to the provider.

28. The system according to claim 18, wherein the cost is determined based on an extent to which at least one other video capture device accessible by a provider is able to fulfil a task of the video capture device associated with the initial configuration state.

* * * * *